(12) United States Patent
Scott

(10) Patent No.: US 10,690,536 B2
(45) Date of Patent: Jun. 23, 2020

(54) MULTIHEAD WEIGHER AND WEIGHING METHOD

(71) Applicant: Frito-Lay Trading Company GmbH, Berne (CH)

(72) Inventor: Clive Bernard Scott, Swansea (GB)

(73) Assignee: Frito-Lay Trading Company GmbH, Berne (CH)

( * ) Notice: Subject to any disclaimer, the term of this patent is extended or adjusted under 35 U.S.C. 154(b) by 241 days.

(21) Appl. No.: 15/575,068

(22) PCT Filed: May 24, 2016

(86) PCT No.: PCT/EP2016/061657
§ 371 (c)(1),
(2) Date: Nov. 17, 2017

(87) PCT Pub. No.: WO2016/188987
PCT Pub. Date: Dec. 1, 2016

(65) Prior Publication Data
US 2018/0143066 A1 May 24, 2018

(30) Foreign Application Priority Data
May 28, 2015 (GB) .................................. 1509190.3

(51) Int. Cl.
*G01G 19/393* (2006.01)
*G01G 13/02* (2006.01)
(52) U.S. Cl.
CPC ......... *G01G 19/393* (2013.01); *G01G 13/024* (2013.01)

(58) Field of Classification Search
CPC ........................ G01G 19/393; G01G 13/024
(Continued)

(56) References Cited

U.S. PATENT DOCUMENTS 4,497,385 A * 2/1985 Sashiki .................. G01G 13/00
177/244
4,538,693 A * 9/1985 Klopfenstein ....... G01G 19/393
177/112
(Continued)

FOREIGN PATENT DOCUMENTS

EP 0125903 A2 11/1984
JP 6418025 A 1/1989
(Continued)

*Primary Examiner* — Peter J Macchiarolo
*Assistant Examiner* — Monica S Young
(74) *Attorney, Agent, or Firm* — Barnes & Thornburg LLP; G. Peter Nichols

(57) ABSTRACT

A multihead weigher that includes a feeder plate for receiving a product supply that has at least one feed outlet at an inner edge of the annular feeder plate. A plurality of staging hoppers is located beneath the outlet of the annular feeder plate. Each staging hopper has a staging inlet and a staging outlet. The staging inlet is located for receiving product from the annular feeder plate. A plurality of weigh hoppers are located beneath the plurality of staging hoppers. Each weigh hopper has an inlet and an outlet. The weigh hopper inlet is located beneath a respective staging outlet; and a collector is located beneath the weigh hoppers for receiving product from the weigh hopper outlets. The collector has a tubular element for receiving a weighed batch of the product from one or more weigh hoppers and the tubular element has a lower dispensing outlet.

47 Claims, 3 Drawing Sheets

Figure 1:
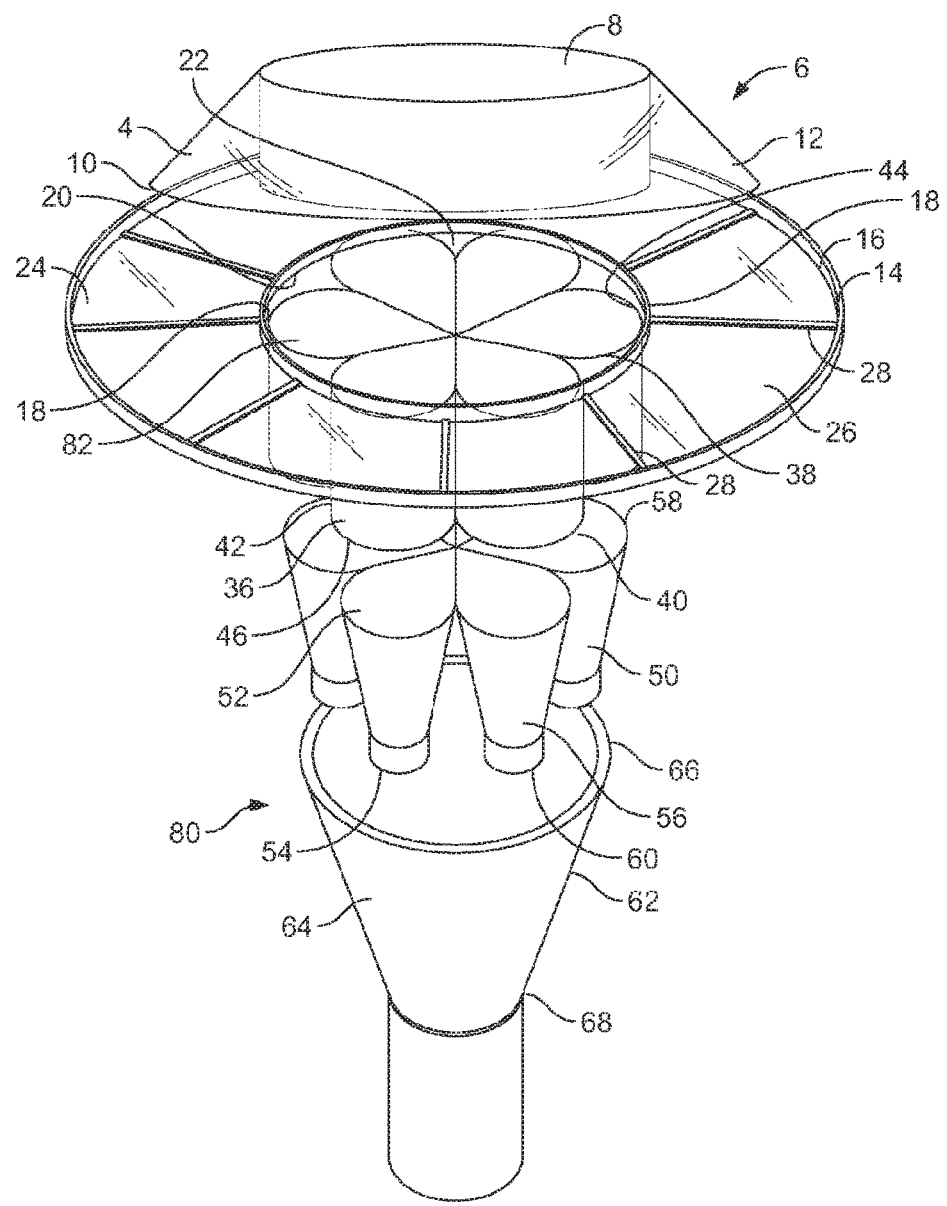

(58) Field of Classification Search
USPC .......................................................... 177/158
See application file for complete search history.

(56) References Cited

U.S. PATENT DOCUMENTS

| | | | | | |
|---|---|---|---|---|---|
| 4,558,774 | A | * | 12/1985 | Mikami | G01G 19/393 177/25.18 |
| 4,629,017 | A | * | 12/1986 | Shroyer | B65B 1/34 177/1 |
| 5,240,118 | A | * | 8/1993 | Mayer | B07B 13/16 209/539 |
| 5,340,949 | A | * | 8/1994 | Fujimura | G01G 17/04 141/128 |
| 5,765,655 | A | * | 6/1998 | Tatsuoka | G01G 13/16 177/105 |
| 6,119,842 | A | * | 9/2000 | Richardson | B65G 47/1407 177/103 |
| 6,286,717 | B1 | * | 9/2001 | Schmidhuber | G01G 13/16 141/248 |
| 8,584,713 | B2 | | 11/2013 | Kawanishi | |
| 2002/0157874 | A1 | * | 10/2002 | Wako | G01G 19/393 177/25.18 |
| 2008/0047761 | A1 | * | 2/2008 | Kawanishi | G01G 19/393 177/25.18 |
| 2013/0292191 | A1 | * | 11/2013 | Nagai | G01G 19/393 177/59 |
| 2015/0129323 | A1 | * | 5/2015 | Tamai | G01G 19/393 177/25.18 |
| 2015/0226600 | A1 | * | 8/2015 | Kikuchi | G01G 19/393 177/25.18 |
| 2016/0334265 | A1 | * | 11/2016 | Kageyama | G01G 19/00 |
| 2017/0299423 | A1 | * | 10/2017 | Horitani | G01G 19/393 |
| 2018/0023996 | A1 | * | 1/2018 | Ikeda | B65G 27/08 198/572 |
| 2019/0072425 | A1 | * | 3/2019 | Kageyama | G01G 19/393 |

FOREIGN PATENT DOCUMENTS

| | | | |
|---|---|---|---|
| JP | 1137832 A | 2/1999 | |
| WO | 2004042335 A1 | 5/2004 | |
| WO | WO2004042335 A1 * | 5/2004 | ........... G01G 19/393 |

* cited by examiner

MULTIHEAD WEIGHER AND WEIGHING METHOD

CROSS-REFERENCE TO RELATED APPLICATIONS

This application is a US 371 National Stage Application from PCT/EP2016/061657 filed May 24, 2016, which claimed the priority of Great Britain Application No. 1509190.3 filed May 28, 2015, the technical disclosures of which are hereby incorporated herein by reference.

The present invention relates to a multihead weigher for weighing a batch of a product. The present invention also relates to a method of weighing a batch of a product. The present invention has particular application in the weighing of batches of snack food pieces, most particularly snack food chips or potato chips which have low density.

It is known in the art to provide a multihead weigher, otherwise known as a statistical weigher, which provides a weighed batch of product. Such a multihead weigher is disclosed in, for example, EP-A-2063237.

The multihead weigher receives a supply of the product to be weighed. The supply is fed to a hopper system which periodically supplies product to an array of weigh hoppers. Each weigh hopper receives a targeted weight of the product. The actual weight of each product in each weigh hopper is measured. The plural individual weights are compared, and then a selected one or more weigh hoppers is emptied into a collector to provide a batch of the product which is closest to, yet exceeds, a target minimum batch weight. The comparison is carried out by a processing system which checks the weight in each weigh hopper, and then calculates which combination of weights achieves the target minimum batch weight. For example if there are 20 weigh hoppers, and the target minimum batch weight is 100 grams, the processing system may function to select five of the weigh hoppers to be opened to dispense product into the collector. These five weigh hoppers may, in that cycle, cumulatively contain a total amount of the product which is closest to, yet exceeds, the target minimum batch weight.

It is well known to use such multihead weighers in combination with packaging machines such as vertical form fill and seal (VFFS) machines which package individual weighed batches of the product into bags which are sealed at their upper and lower ends. Such a packaging apparatus is used in the snack food industry for packaging snack foods such as snack chips, potato chips and other salty snacks.

Current commercially available multihead weighers are capable of outputting up to 250 weighed batches per minute. However, the achievement of this packaging rate is product dependent. There is a problem that such high packaging rates are not reliably achievable when packaging snack foods into bags using a current commercially available multihead weigher. For low density and lightweight products such as snack chips and potato chips, the packaging rate into bags is limited to up to 110 weighed batches per minute, and for higher density heavier products such as salty snacks, for example nuts, the packaging rate into bags is limited to up to 140 weighed batches per minute.

There is accordingly a need in the art for a multihead weigher, and associated weighing method, which can achieve increased packaging rates for snack foods, in particular low density and lightweight products such as snack chips and potato chips, for example up to 250 weighed batches per minute.

Another problem with current commercially available multihead weighers is that when packaging snack foods into bags, in particular when packaging low density and lightweight products such as snack chips and potato chips, the time period for the weighed batch to drop into the bag can be rather long as a result of the "slug" length, measured in the direction of movement under gravity, of the batch being rather long. This can sometimes cause a problem of chips in the trailing end of the batch being inadvertently trapped in the hermetic seal formed along the upper edge of the bag. Such packaging failures are clearly undesirable.

There is accordingly a need in the art for a multihead weigher, and associated weighing method, which can achieve increased speed and reduced "slug" length of packaged batches, in particular when packaging low density and lightweight products such as snack chips and potato chips, thereby potentially reducing packaging errors.

A further particular problem with known multihead weighers is that the physical size of the current commercially available multihead weighers is excessively large. A typical multihead weigher has a height of 2.4 metres, and a typical footprint of 2 square metres.

There is a general desire to minimize the physical size of packaging apparatus, in order to take up less space in a packaging facility. There is accordingly a need in the art for a multihead weigher having a reduced physical size as compared to current commercially available multihead weighers of similar capacity.

There is also a general desire to minimize the cost and complexity of packaging apparatus for a given packaging capacity. Known multihead weighers suitable for high speed packaging of snack chips into bags require a high number of weigh hoppers and corresponding staging hoppers upstream thereof, such as 14 to 16 weigh hoppers.

There is a need in the art for a multihead weigher having a reduced cost and complexity, in particular a reduced number of weigh hoppers as compared to current commercially available multihead weighers of similar capacity suitable for high speed packaging of snack chips into bags.

The present invention accordingly provides a multihead weigher for weighing a batch of a product, the multihead weigher comprising: an upper annular feeder plate for receiving a supply of the product to be weighed, the annular feeder plate having at least one feed outlet at a radially inner edge of the annular feeder plate, an opening being defined by the radially inner edge of the annular feeder plate; a plurality of staging hoppers located beneath the opening of the annular feeder plate, each staging hopper having an upper staging inlet and a lower staging outlet, the upper staging inlet being located beneath at least one feed outlet for receiving product from the annular feeder plate; a plurality of weigh hoppers located beneath the plurality of staging hoppers, each weigh hopper having an upper weigh inlet and a lower weigh outlet, the upper weigh inlet being located beneath a respective staging outlet; and a collector located beneath the plurality of weigh hoppers for receiving product from the lower weigh outlets, the collector comprising a tubular element for receiving a weighed batch of the product from a selected one or more weigh hoppers of the plurality the weigh hoppers, the tubular element having a lower dispensing outlet.

The present invention further provides a method of weighing a batch of a product, the method comprising the steps of:

a. receiving a bulk supply of the product to be weighed on an annular feeder plate;

b. moving the product radially inwardly on the annular feeder plate to a radially inner edge of the annular feeder plate;

c. dispensing the product downwardly under the action of gravity through an opening defined by the radially inner edge of the annular feeder plate into a plurality of staging hoppers located beneath the annular feeder plate;

d. periodically dispensing the product from the staging hoppers downwardly under the action of gravity into a plurality of weigh hoppers located beneath the plurality of staging hoppers;

e. periodically dispensing the product from a selected one or more of the weigh hoppers downwardly under the action of gravity into a collector located beneath the plurality of weigh hoppers to provide in the collector a weighed batch of the product, the collector comprising a tubular element having a lower dispensing outlet, the lower dispensing outlet having a width less than the width of the opening wherein in dispensing steps c, d and e the product is funneled from the opening towards the lower dispensing outlet.

Preferred features are defined in the dependent claims.

The multihead weigher of the invention is preferably configured or adapted for weighing a batch of a food product, for example a batch of snack food pieces, optionally potato chips.

The present inventors is predicated on the devising by the present inventors of a statistical weighing apparatus and method which can optimize the action of gravity and minimize excessive product movement through the multihead weigher.

The preferred embodiments of the present invention provide that the product to be weighed into batches by the multihead weigher is fed to the dispensing head and then dispensed outwardly to the annular feeder plate. Thereafter the product is fed from the annular feeder plate to the axial centre of the multihead weigher. There is a central formation of hoppers, both staging hopes and then weigh hoppers, which functions as a 'funnel' so that the weigh hoppers directly feed the weighed batch into the tube former of a packaging machine such as a bag maker.

As compared to known multihead weighers, electrical control cabinets can be removed from the product flow to reduce potential food safety problems, and the only parts of the multihead weigher that are in the vicinity of the packaged food are in the product flow path.

Accordingly, the preferred embodiments of the present invention provide statistical multihead weighers which control the transportation of product through the weigher so as to minimize constraints on high speeds, whilst maintaining high levels of weighing accuracy and precision.

The preferred embodiments of the present invention provide statistical multihead weighers which can convey the weighed batch of product from the weigher to the pack in the shortest possible time, to provide the most compact 'slug' of product.

By transforming a current multihead weigher design which has hoppers positioned so that product needs to be fed 'outwards' to them, to a design in which the hopers receive product fed 'inwards' to them, this can result in not only lower stack heights, reducing the capital cost of new installations and the ongoing maintenance costs, but also increased speed due to maintaining the critical product flow in the centre of the equipment. The packaging rate of the preferred embodiments for snack chips can be as high as circa 250 bags per minute, as compared to a current 'best result' for typical current commercial multihead weighers of 165 bags per minute maximum on snacks and 150 bags per minute maximum on potato chips, although the current normal standard is circa 110 bags per minute.

Current statistical weighers are capable of up to 250 weights per minute. The constraint on achieving these speeds is due to the transition time of the product to travel from the weigh hopper to the pack. For light products such as snacks and potato chips this limits speed to 110 bags per minute on potato chips and 140 bags per minute on salty snacks. The preferred embodiments of the present invention provide statistical multihead weighers which can package these light products at a packaging rate at or close to the 250 bags per minute potential of the statistical weigher.

This enhanced packaging rate provides the advantage of potentially reducing the footprint of packing halls by circa 50% and the height of the statistical weighers by 30%.

Further benefits can be achieved from the reduction in parts. The significant increase in weighing speeds, and a consequential faster cycle time, can be utilized to reduce the number of weigh heads for a given weighing and packaging capacity. For example, a reduction from 14 or 16 weigh heads currently, to 8 weigh heads in embodiments of the present invention may be achieved. The embodiments of the present invention can maintain or increase weighing and packaging speed but significantly reduce the number of parts required, with consequential reduction in cleaning and maintenance costs. The reduced number of hopper parts, and therefore size, can provide the advantage of 'clip on-clip off' hoppers, for which no tools are required for installation, and enabling easy swapping of hopper units for product-changeover purposes. The reduced parts also enable the potential to use food safe materials other than stainless steel on some parts, for example polypropylene, enabling the potential for 3D printing of some parts. Electrical control cabinets would sit around the weigher, removing them from being within the product flow.

Figure 2:
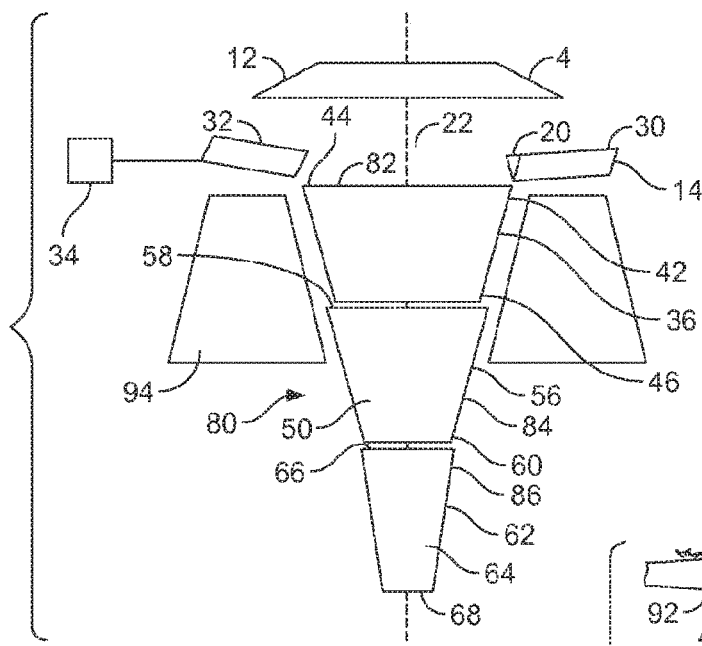
Figure 3:
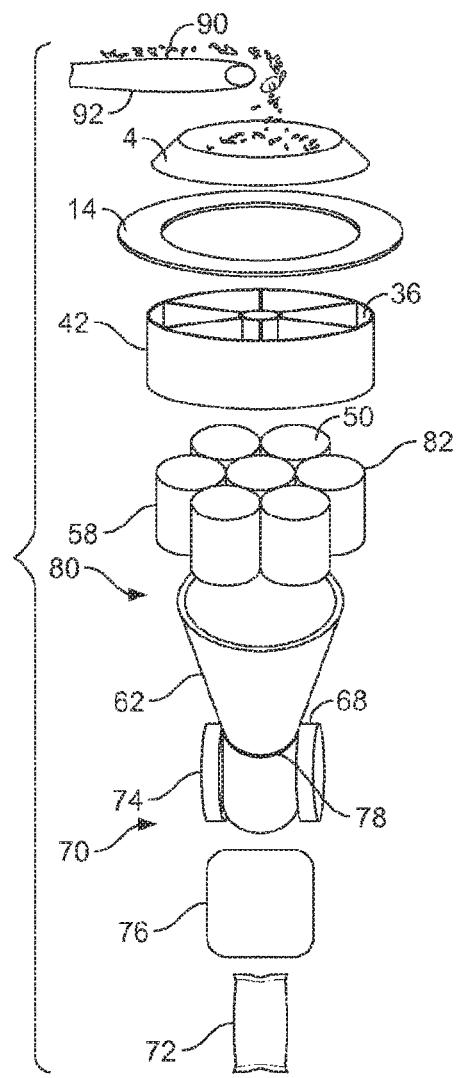
Figure 4:
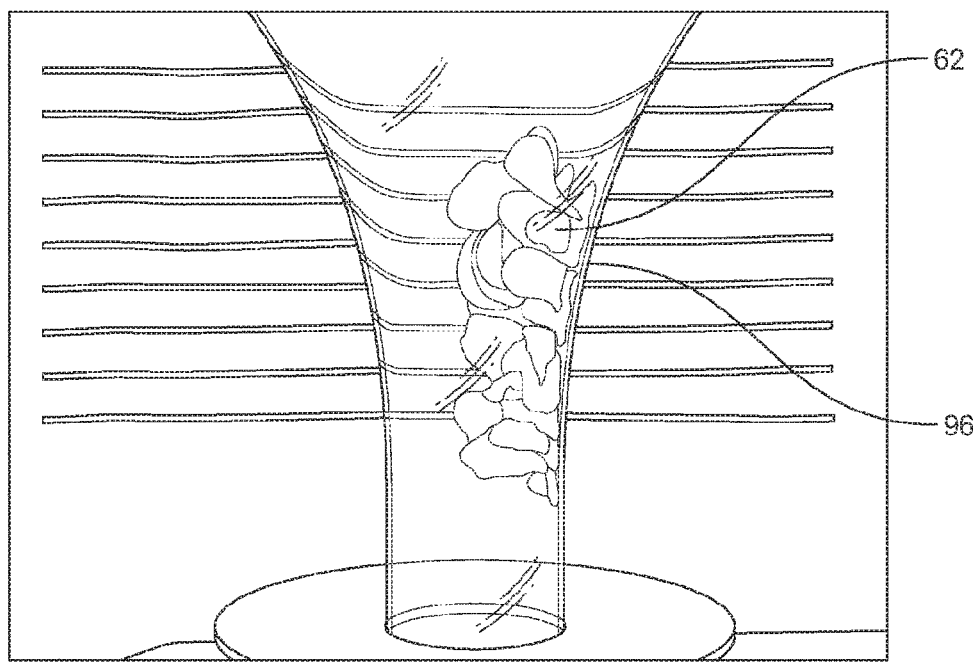
Figure 5:
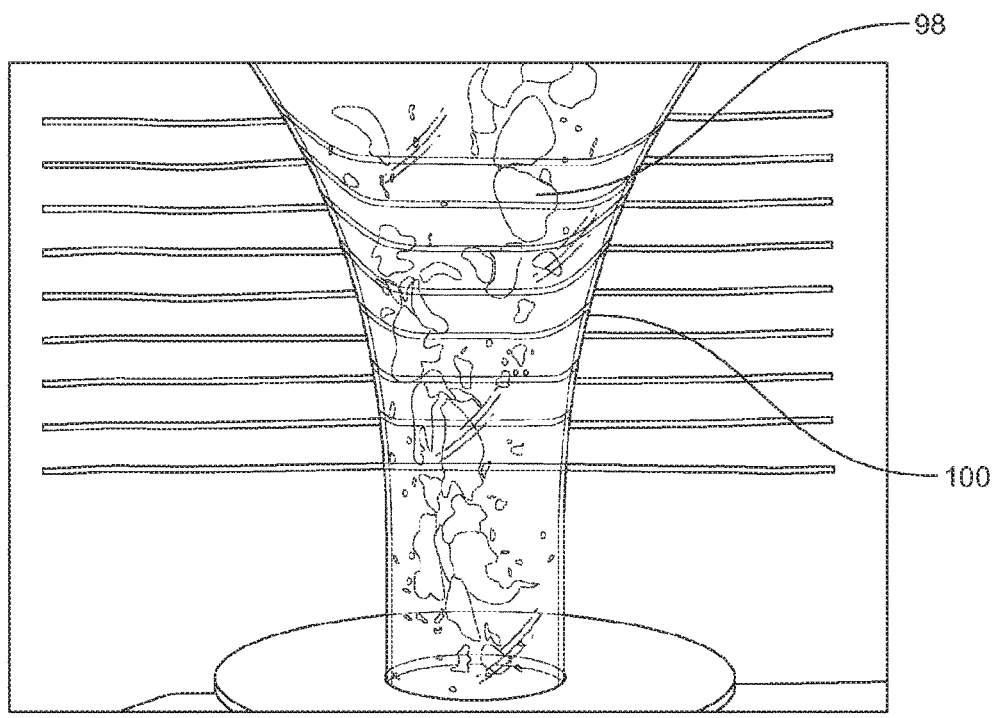

Embodiments of the present invention will now be described, by way of example only, with reference to the accompanying drawings in which:

FIG. 1 schematically illustrates a perspective view, from above and one side, of a multihead weigher for weighing a batch of a product in accordance with a first embodiment of the present invention;

FIG. 2 schematically illustrates a side view of a multihead weigher for weighing a batch of a product in accordance with a second embodiment of the present invention;

FIG. 3 schematically illustrates a perspective view, from above and one side, of a multihead weigher for weighing a batch of a product in accordance with a third embodiment of the present invention;

FIG. 4 illustrates a slug of potato chips produced using a multihead weigher in accordance with an embodiment of the present invention; and FIG. 5 illustrates a slug of potato chips produced using a known multihead weigher.

FIG. 1 schematically illustrates a multihead weigher 2 for weighing a batch of a product in accordance with an embodiment of the present invention. FIG. 2 schematically illustrates a multihead weigher 2 for weighing a batch of a product in accordance with a modified embodiment of the present invention. In FIG. 2 the orientation of the annular feeder plate, the external shaping of the hopper system and the location of external circuitry and control systems are shown differently than what is illustrated in FIG. 1.

The multihead weigher 2 comprises a dispersion feeder 4 located at an upper end 6 of the multihead weigher 2. The dispersion feeder 4 comprises a central upper input end 8 surrounded by an annular lower output end 10. The input and output ends 8, 10 are connected thereto by a delivery surface 12, which is downwardly and radially outwardly inclined. Typically, the delivery surface 12 is substantially frustoconical.

The annular lower output end 10 is located to feed product under the action of gravity downwardly onto an annular feeder plate 14 located beneath the dispersion feeder 4 for receiving a supply of the product to be weighed from the dispersion feeder 4. The annular lower output end 10 is located to feed product into a radially outer portion 16 of the annular feeder plate 14.

The product comprises a plurality of items to be weighed and packaged to form a weighed batch of product which comprises a plurality of the items. For example, the product comprises potato chips and each item is a potato chip. The apparatus and method of the invention may be used to weigh and package a variety of different products, including but not limited to snack foods. The items may be in the form of food pieces, for example snack food pieces such as potato chips, but other shapes and dimensions, and compositions, of items may be weighed and packaged in accordance with this invention.

The annular feeder plate 14 has at least one feed outlet 18 at a radially inner edge 20 of the annular feeder plate. A central opening 22, typically circular in plan, is defined by the radially inner edge 20. The annular feeder plate has a plurality of compartments 24 located around the annular feeder plate. Each compartment 24 has a respective feed outlet 18 at the radially inner edge 20. Each compartment 24 comprises an annular segment 26 defined between respective opposed radial walls 28.

As shown in greater detail in FIG. 2 which is a modification of the multihead feeder of FIG. 1, the annular feeder plate 14 is typically substantially frustoconical, having the radially inner edge 20 of the annular feeder plate 14 lower than a radially outer edge 30 of the annular feeder plate 14. This provides a feeder surface 32 which is downwardly and radially inwardly inclined.

Typically, the radially inner edge 20 of the annular feeder plate 14 has a diameter of from 200 to 750 mm, for example from 250 to 500 mm, and/or the annular feeder plate 14 has an outer diameter of from 500 to 1000 mm.

As schematically shown in FIG. 2, a vibration mechanism 34 is coupled to the annular feeder plate 14 for vibrating the annular feeder plate 14 to assist product flow across the feeder surface 32 both radially inwardly and downwardly.

A plurality of staging hoppers 36 is located beneath the opening 22 of the annular feeder plate 14. Product is dropped from the annular feeder plate 14 downwardly into the respective staging hoppers 36. Each staging hopper 36 has an upper staging inlet 38 and a lower staging outlet 40. The upper staging inlet 38 is located beneath at least one feed outlet 18 for receiving product from the annular feeder plate 14. At least one feed outlet 18 is located above each respective staging hopper 36.

The plurality of staging hoppers 36 form an annular array 42. An outer circumference of an upper end 44 of the annular array 42 of staging hoppers 36 is located radially inwardly of the radially outer edge 30 of the annular feeder plate 14. Additionally, an outer circumference of a lower end 46 of the annular array 42 of staging hoppers 36 is located radially inwardly of the radially inner edge 20 of the annular feeder plate 14. In the embodiment of FIG. 1, the annular array 42 of staging hoppers 36 is substantially cylindrical, having a lower outlet end 46 substantially the same in diameter as an upper inlet end 44. In the embodiment of FIG. 2, the annular array 42 of staging hoppers 36 is substantially frustoconical, having a lower outlet end 46 smaller in diameter than an upper inlet end 44.

A plurality of weigh hoppers 50 is located beneath the plurality of staging hoppers 36. Each weigh hopper 50 has an upper weigh inlet 52 and a lower weigh outlet 54. The upper weigh inlet 52 is located beneath a respective staging outlet 40.

The plurality of weigh hoppers 50 forms an annular array 56. An outer circumference of an upper end 58 of the annular array 56 of weigh hoppers 50 is located radially inwardly of an outer circumference of the upper end 44 of the annular array 42 of staging hoppers 36. Additionally, an outer circumference of a lower end 60 of the annular array 56 of weigh hoppers 50 is located radially inwardly of an outer circumference of the lower end 46 of the annular array 42 of staging hoppers 36. In this embodiment, the annular array 56 of weigh hoppers 50 is substantially frustoconical, having the lower outlet end 60 smaller in diameter than the upper inlet end 58. However, in an alternative arrangement the annular array 56 of weigh hoppers 50 is substantially cylindrical.

Typically, the multihead weigher 2 comprises from 6 to 12, optionally from 8 to 10, staging hoppers 36 and weigh hoppers 50, each staging hopper 36 having a corresponding associated weigh hopper 50 thereunder.

A collector 62 is located beneath the plurality of weigh hoppers 50 for receiving product from the lower weigh outlets 54. The collector 62 comprises a tubular element 64 for receiving a weighed batch of the product from a selected one or more weigh hoppers 50 of the plurality the weigh hoppers 50. The tubular element 64 has an upper inlet 66 and a lower dispensing outlet 68. The tubular element 64 of the collector 62 is substantially frustoconical having the upper inlet 66 larger than the lower dispensing outlet 68. The upper inlet 66 larger than the lower outlet end 60 but smaller than the upper inlet end 58 of the annular array 56 of weigh hoppers 50.

Typically, the upper inlet 66 of the collector 62 has an outer diameter of from 200 to 750 mm, for example from 250 to 500 mm.

In any embodiment of the invention, the plurality of staging hoppers 36 and the plurality of weigh hoppers 50, or only the staging hoppers 36 or the weigh hoppers 50, may be configured to permit the product to fall substantially vertically as the product is passed from the annular feeder plate 14 to the collector 62. Each staging hopper 36 may be substantially cylindrical and have a substantially vertically oriented annular sidewall and, alternatively or in combination, each weigh hopper 50 may be substantially cylindrical and have a substantially vertically oriented annular sidewall.

As shown in the embodiment of FIG. 3, the multihead weigher 2 further comprises a packaging device 70, in particular a vertical form fill and seal machine (VFFS), for packaging the weighed batches of the product into respective bags 72. The packaging device 70 comprises a pull belt and vertical seal unit 74 and a rotary seal unit 76, both of which are conventional in the art. The lower dispensing outlet 68 is coupled to an input 78 of the packaging device 70.

The annular feeder plate 14, the plurality of staging hoppers 36, the plurality of weigh hoppers 50 and the collector 62 are configured to cause the product to be passed from the annular feeder plate 14 to the collector 62 under the action of gravity. The plurality of staging hoppers 36, the plurality of weigh hoppers 50 and the collector 62 form a funnel-shaped assembly 80 which preferably progressively decreases in width from an upper input 82 of the plurality of staging hoppers 36 to the lower dispensing outlet 68 of the tubular element 64. However, the plurality of staging hoppers 36 and the plurality of weigh hoppers 50 in this embodiment are configured to permit the product to fall substantially vertically as the product is passed from the annular feeder plate 14 to the collector 62. Each staging hopper 36 is substantially cylindrical and has a substantially vertically oriented annular sidewall and each weigh hopper 50 is substantially cylindrical and has a substantially vertically oriented annular sidewall. The collector 62 is frustoconical but above the collector 62 the product, preferably all of the product, but in other embodiments a majority of the number of items in the product, falls vertically, without any horizontal component, from the annular feeder plate 14 to the collector 62.

Typically, the plurality of staging hoppers 36, the plurality of weigh hoppers 50 and the collector 62 form an assembly having a height of from 1000 to 1750 mm, for example from 1000 to 1200 mm.

The annular feeder plate 14, the plurality of staging hoppers 36, the plurality of weigh hoppers 50 and the collector 62 are preferably aligned along a longitudinal axis, shown by line L-L in FIG. 2, of the multihead weigher 2 which in use is vertically oriented. The annular feeder plate 14, the plurality of staging hoppers 36, the plurality of weigh hoppers 50 and the collector 62 are preferably configured progressively to funnel the product towards the longitudinal axis of the multihead weigher 2 as the product is passed from the annular feeder plate 14 to the collector 62. In the embodiment of FIG. 2, the annular feeder plate 14, the plurality of staging hoppers 36 the plurality of weigh hoppers 50 and the collector 62 are configured, sequentially in each of the annular feeder plate 14, the plurality of staging hoppers 36, the plurality of weigh hoppers 50 and the collector 62, to funnel the product towards the longitudinal axis of the multihead weigher 2 as the product is passed from the annular feeder plate 14 to the collector 62, whereas in the embodiment of FIG. 1 the staging hoppers 36 are not frustoconical or funneled and in the embodiment of FIG. 3 neither the staging hoppers 36 or the weigh hoppers 50 are frustoconical or funneled.

Preferably, the plurality of staging hoppers 36, the plurality of weigh hoppers 50 and the collector 62 form a substantially frustoconical assembly 84. Typically, as shown in FIG. 2 an outer surface 86 of the substantially frustoconical assembly 84 is inclined at an angle of from 0 to 25 degrees, for example from 0 to 10 degrees, relative to the longitudinal axis.

The radially inner edge 20 of the annular feeder plate 14 is preferably comprised in the funnel-shaped assembly 84.

Preferably, the radially inner edge 20 of the annular feeder plate 14 has a larger width than the outlet end 46 of the plurality of staging hoppers 36, the outlet end 46 of the plurality of staging hoppers 36 has a larger width than an outlet end 60 of the plurality of weigh hoppers 50, and the outlet end 60 of the plurality of weigh hoppers 50 has a larger width than the lower dispensing outlet 68 of the tubular element 64 of the collector 62.

In the method of weighing a batch of a product, for example snack food such as snack chips or potato chips, using the multihead weigher 2, initially a bulk supply of the product 90 to be weighed is fed towards the multihead weigher 2 by a conveyor 92, shown schematically in FIG. 3. Typically a continuous flow of the product 90 is provided. The conveyor 92 deposits the bulk supply of product 90 onto the dispersion feeder 4. The product slides down the dispersion feeder 4 to be received in then outer annular portion 16 of the annular feeder plate 14.

The product is moved radially inwardly on the annular feeder plate 14, by sliding down the inclined surface 32 and assisted by vibration from the vibration mechanism 34, to the radially inner edge 20 of the annular feeder plate 14. Then the product is dispensed downwardly under the action of gravity through the opening 20 into the staging hoppers 36 located beneath the annular feeder plate 14.

The product is thereafter periodically dispensed from the staging hoppers 36 downwardly under the action of gravity into the weigh hoppers 50 located beneath the plurality of staging hoppers 36.

The product is then periodically dispensed from a selected one or more of the weigh hoppers 50 downwardly under the action of gravity into the collector 62 located beneath the plurality of weigh hoppers 50 to provide in the collector 62 a weighed batch of the product. Finally, the weighed batch of the product is output from the lower dispensing outlet 68 into the input 78 of the packaging device 70.

Accordingly, the multihead weigher 2 receives a substantially continuous supply of the product to be weighed and then individual bags 72 are packaged with a statistically calculated weighed amount of the product, each bag 72 being packaged with a respective individually weighed batch of product in a respective weighing and packaging cycle.

The continuous supply is fed by the dispersion feeder 4 radially outwardly to the annular feeder plate 14. Thereafter the movement of the product within the multihead weigher 2 is under the action of gravity and progressively funneled towards the central longitudinal axis, without any radially outward movement of the product. The annular feeder plate 14 feeds the product radially inwardly to the staging hopper 36 system which thereafter periodically supplies the product to the array of weigh hoppers 50.

When a control signal from a processing unit 94 confirms that a weigh hopper 50 is empty, the respective staging hopper 36 thereabove is opened to drop a targeted weight amount of the product into the weigh hopper 50. Each weigh hopper 50 receives a targeted weight of the product. In each cycle, the actual weight of each product in each weigh hopper 50 is measured. The plural individual weights are compared. The comparison is carried out by the processing unit 94 which checks the weight in each weigh hopper 50, and then calculates which combination of weights achieves the target minimum batch weight, i.e. in that cycle, which combination of weigh hoppers 50 cumulatively contains a total amount of the product which is closest to, yet exceeds, the target minimum batch weight. Then a selected one or more weigh hoppers 50 is emptied into the collector 62 to provide a batch of the product which is closest to, yet exceeds, the target minimum batch weight.

During the successive dispensing steps from the annular feeder plate 14 to the staging hoppers 36, from the staging hoppers 36 to the weigh hoppers 50, and from the weigh hoppers 50 to the collector 62, the product is progressively funneled from the opening 22 in the annular feeder plate 14 towards the lower dispensing outlet 68. The product is progressively funneled towards the longitudinal axis as the product is passed from the annular feeder plate 14 to the collector 62. Preferably, sequentially in each of the annular feeder plate 14, the plurality of staging hoppers 36, the plurality of weigh hoppers 50 and the collector 62, the product is funneled towards the longitudinal axis as the product is passed from the annular feeder plate 14 to the collector 62.

The weighed batches of the product are packaged into respective bags 72 in the packaging device 70. The weighed batches of the product are directly fed into the packaging device 70 from the collector 62.

In accordance with the preferred embodiments of the present invention, the stack height and width of the multihead weigher can be reduced. Only one staging hopper assembly is required upstream of the weighing hoppers, avoiding additional serial staging hopers as required by some known multihead weighers. The number of weigh hoppers can be reduced. The product can be caused to flow at high speed through a centre of the multihead weigher. Slug lengths of the weighed batch from the weighing hopper assembly can be reduced, and the weighed batch can be dropped directly into a bag former of a packaging apparatus. The multihead weigher of the preferred embodiments can have a height of less than 1.5 metres, for example about 1 to 1.2 metres, and a width of less than 3 metres, for example about 2.7 metres, yet permit packaging of lightweight snack food at a packaging rate of about 250 weighed batches per minute.

FIG. 4 shows how a slug of potato chips 96 in a conical collector 62 in a multihead weigher in accordance with the preferred embodiments of the present invention can be compact and reduced in length. In FIG. 4, the 'drop time' of the product slug is 725 milliseconds.

In comparison, FIG. 5 shows how a slug of potato chips 98 in a conical collector 100 of a known multihead weigher is extended and dispersed. In FIG. 5 the 'drop time' of the product slug is 850 milliseconds.

Thus the multihead weigher in accordance with the preferred embodiments of the present invention can provide, for example, a 14.7% reduction in product drop time for snack foods, such as potato chips. This enables an increase in speed of production during packaging. Also, a reduction in the distance the product slug needs to fall from the weigh hoppers to the input of the packaging machine can provide a further 60% reduction in drop time. In accordance with the preferred embodiments of the present invention, the drop time, therefore, would be about 275 to 400 milliseconds, for example about 300 milliseconds, providing the opportunity to achieve the maximum potential speeds of the weigher of 250 packaged batch weights per minute, or more.

The invention claimed is:

1. A multihead weigher for weighing a batch of a product, the multihead weigher comprising:
   an upper annular feeder plate for receiving a supply of the product to be weighed, the annular feeder plate having at least one feed outlet at a radially inner edge of the annular feeder plate, an opening being defined by the radially inner edge of the annular feeder plate;
   a plurality of staging hoppers located beneath the opening of the annular feeder plate, each staging hopper having an upper staging inlet and a lower staging outlet, the upper staging inlet being located beneath at least one feed outlet for receiving product from the annular feeder plate; a plurality of weigh hoppers located beneath the plurality of staging hoppers, each weigh hopper having an upper weigh inlet and a lower weigh outlet, the upper weigh inlet being located beneath a respective staging outlet; and
   a collector located beneath the plurality of weigh hoppers for receiving product from the lower weigh outlets, the collector comprising a tubular element for receiving a weighed batch of the product from a selected one or more weigh hoppers of the plurality the weigh hoppers, the tubular element having a lower dispensing outlet;
   wherein the annular feeder plate, the plurality of staging hoppers, the plurality of weigh hoppers and the collector are aligned along a longitudinal axis of the multihead weigher which in use is vertically oriented,
   wherein the annular feeder plate, the plurality of staging hoppers, the plurality of weigh hoppers and the collector are configured, sequentially in each of the annular feeder plate, the plurality of staging hoppers, the plurality of weigh hoppers and the collector, progressively to funnel the product towards the longitudinal axis of the multihead weigher as the product is passed from the annular feeder plate to the collector under the action of gravity without radially outward movement of the product, and
   wherein the radially inner edge of the annular feeder plate has a larger width than an outlet end of the plurality of staging hoppers, the outlet end of the plurality of staging hoppers has a larger width than an outlet end of the plurality of weigh hoppers, and the outlet end of the plurality of weigh hoppers has a larger width than the lower dispensing outlet of the tubular element of the collector.

2. A multihead weigher according to claim 1 wherein the plurality of staging hoppers and the plurality of weigh hoppers are configured to permit the product to fall substantially vertically as the product is passed from the annular feeder plate to the collector.

3. A multihead weigher according to claim 1 wherein each staging hopper is substantially cylindrical and has a substantially vertically oriented annular sidewall.

4. A multihead weigher according to claim 1 wherein each weighing hopper is substantially cylindrical and has a substantially vertically oriented annular sidewall.

5. A multihead weigher according to claim 1 wherein the plurality of staging hoppers, the plurality of weigh hoppers and the collector form a substantially frustoconical assembly.

6. A multihead weigher according to claim 5 wherein an outer surface of the substantially frustoconical assembly is inclined at an angle of from 0 to 25 degrees relative to the longitudinal axis.

7. A multihead weigher according to claim 1 wherein the annular feeder plate, the plurality of staging hoppers, the plurality of weigh hoppers and the collector are configured to cause the product to be passed from the annular feeder plate to the collector under the action of gravity.

8. A multihead weigher according to claim 1 wherein the plurality of staging hoppers, the plurality of weigh hoppers and the collector form a funnel-shaped assembly which progressively decreases in width from an upper input of the plurality of staging hoppers to the lower dispensing outlet of the tubular element.

9. A multihead weigher according to claim 8 wherein the radially inner edge of the annular feeder plate is comprised in the funnel-shaped assembly.

10. A multihead weigher according to claim 1 wherein the plurality of staging hoppers form an annular array.

11. A multihead weigher according to claim 10 wherein an outer circumference of an upper end of the annular array of staging hoppers is located radially inwardly of a radially outer edge of the annular feeder plate.

12. A multihead weigher according to claim 10 wherein an outer circumference of a lower end of the annular array of staging hoppers is located radially inwardly of the radially inner edge of the annular feeder plate.

13. A multihead weigher according to claim 10 wherein the annular array of staging hoppers is substantially frustoconical, having a lower outlet end smaller in diameter than an upper inlet end.

14. A multihead weigher according to claim 10 wherein the plurality of weighing hoppers form an annular array.

15. A multihead weigher according to claim 14 wherein an outer circumference of an upper end of the annular array of weighing hoppers is located radially inwardly of an outer circumference of an upper end of the annular array of staging hoppers.

16. A multihead weigher according to claim 14 wherein an outer circumference of a lower end of the annular array of weighing hoppers is located radially inwardly of an outer circumference of a lower end of the annular array of staging hoppers.

17. A multihead weigher according to claim 14 wherein the annular array of weighing hoppers is substantially frustoconical, having a lower outlet end smaller in diameter than an upper inlet end.

18. A multihead weigher according to claim 1 wherein the annular feeder plate is substantially frustoconical, having the radially inner edge of the annular feeder plate lower than a radially inner edge of the annular feeder plate.

19. A multihead weigher according to claim 1 wherein the annular feeder plate has a plurality of compartments located around the annular feeder plate, each compartment comprising an annular segment defined between respective opposed radial walls.

20. A multihead weigher according to claim 1 further comprising a vibration mechanism coupled to the annular feeder plate for vibrating the annular feeder plate to assist product flow from the annular feeder plate downwardly into the respective staging hoppers.

21. A multihead weigher according to claim 1 wherein the tubular element of the collector is substantially frustoconical having an upper inlet end larger than the lower dispensing outlet.

22. A multihead weigher according to claim 1 further comprising a packaging device for packaging the weighed batches of the product into respective bags, wherein the lower dispensing outlet is coupled to an input of the packaging device.

23. A multihead weigher according to claim 1 wherein the annular feeder plate has a plurality of compartments located around the annular feeder plate, each compartment having a respective feed outlet at the radially inner edge of the annular feeder plate, and at least one feed outlet is located above each respective staging hopper.

24. A multihead weigher according to claim 1 further comprising a dispersion feeder located above the annular feeder plate, the dispersion feeder comprising a central upper input end surrounded by an annular lower output end and connected thereto by a delivery surface, the annular lower output end being located to feed product under the action of gravity downwardly onto the annular feeder plate.

25. A multihead weigher according to claim 24 wherein the delivery surface is substantially frustoconical.

26. A multihead weigher according to claim 24 wherein the annular lower output end is located to feed product into a radially outer portion of the annular feeder plate.

27. A multihead weigher according to claim 1 wherein the plurality of staging hoppers, the plurality of weigh hoppers and the collector form an assembly having a height of from 1000 to 1750 mm.

28. A multihead weigher according to claim 1 wherein the radially inner edge of the annular feeder plate has a diameter of from 200 to 750 mm.

29. A multihead weigher according to claim 1 wherein the annular feeder plate has an outer diameter of from 500 to 1000 mm.

30. A multihead weigher according to claim 1 wherein an upper input end of the collector has an outer diameter of from 200 to 750 mm.

31. A multihead weigher according to claim 1 which comprises from 6 to 12 staging hoppers, each staging hopper having a corresponding associated weigh hopper thereunder.

32. A multihead weigher according to claim 1 which is configured or adapted for weighing a batch of a food product.

33. A method of weighing a batch of a product, the method comprising the steps of: a. receiving a bulk supply of the product to be weighed on an annular feeder plate; b. moving the product radially inwardly on the annular feeder plate to a radially inner edge of the annular feeder plate; c. dispensing the product downwardly under the action of gravity through an opening defined by the radially inner edge of the annular feeder plate into a plurality of staging hoppers located beneath the annular feeder plate; d. periodically dispensing the product from the staging hoppers downwardly under the action of gravity into a plurality of weigh hoppers located beneath the plurality of staging hoppers; e. periodically dispensing the product from a selected one or more of the weigh hoppers downwardly under the action of gravity into a collector located beneath the plurality of weigh hoppers to provide in the collector a weighed batch of the product, the collector comprising a tubular element having a lower dispensing outlet, the lower dispensing outlet having a width less than the width of the opening; wherein in dispensing steps c, d and e the product is funneled from the opening towards the lower dispensing outlet; wherein the annular feeder plate, the plurality of staging hoppers, the plurality of weigh hoppers and the collector under the action of gravity without radially outward movement of the product are aligned along a longitudinal axis which is vertically oriented; wherein the annular feeder plate, the plurality of staging hoppers, the plurality of weigh hoppers and the collector are configured, sequentially in each of the annular feeder plate, the plurality of staging hoppers, the plurality of weigh hoppers and the collector, progressively to funnel the product towards the longitudinal axis as the product is passed from the annular feeder plate to the collector; and wherein the radially inner edge of the annular feeder plate has a larger width than an outlet end of the plurality of staging hoppers, the outlet end of the plurality of staging hoppers has a larger width than an outlet end of the plurality of weigh hoppers, and the outlet end of the plurality of weigh hoppers has a larger width than the lower dispensing outlet of the tubular element of the collector.

34. A method according to claim 33 wherein the plurality of staging hoppers and the plurality of weigh hoppers are configured to permit the product to fall substantially vertically as the product is passed from the annular feeder plate to the collector.

35. A method according to claim 33 wherein each staging hopper is substantially cylindrical and has a substantially vertically oriented annular sidewall.

36. A method according to claim 33 wherein each weighing hopper is substantially cylindrical and has a substantially vertically oriented annular sidewall.

37. A method according to claim 33 wherein the plurality of staging hoppers, the plurality of weigh hoppers and the collector form a funnel-shaped assembly which progressively decreases in width from an upper input of the plurality of staging hoppers to the lower dispensing outlet of the tubular element.

38. A method according to claim 37 wherein the radially inner edge of the annular feeder plate is comprised in the funnel-shaped assembly.

39. A method according to claim 33 wherein the plurality of staging hoppers form an annular array.

40. A method according to claim 39 wherein the plurality of weighing hoppers form an annular array.

41. A method according to claim 33 further comprising vibrating the annular feeder plate in step b to assist product flow from the annular feeder plate downwardly into the staging hoppers.

42. A method according to claim 33 further comprising the step of packaging the weighed batches of the product into respective bags in a packaging device, wherein the lower dispensing outlet is coupled to an input of the packaging device and the weighed batches of the product are directly fed into the packaging device from the collector.

43. A method according to claim 33 further comprising the step of feeding a supply of product under the action of gravity downwardly onto the annular feeder plate by a dispersion feeder located above the annular feeder plate, the dispersion feeder comprising a central upper input end surrounded by an annular lower output end and connected thereto by a delivery surface.

44. A method according to claim 43 wherein the delivery surface is substantially frustoconical.

45. A method according to claim 43 wherein the annular lower output end feeds product into a radially outer portion of the annular feeder plate.

46. A method according to claim 33 which comprises from 6 to 12, optionally from 8 to 10, staging hoppers, each staging hopper having a corresponding associated weigh hopper thereunder.

47. A method according to claim 33 wherein the product is a batch of a food product, for example a batch of snack food pieces, optionally potato chips.

* * * * *